(12) United States Patent
Serralta et al.

(10) Patent No.: US 10,329,745 B2
(45) Date of Patent: Jun. 25, 2019

(54) FLOOD MITIGATION AND PIPE FREEZE PREVENTION SYSTEMS FOR USE IN A STRUCTURE

(71) Applicants: Denset Serralta, Miami, FL (US); Rogerio Garcia, Pepperell, MA (US)

(72) Inventors: Denset Serralta, Miami, FL (US); Rogerio Garcia, Pepperell, MA (US)

( * ) Notice: Subject to any disclaimer, the term of this patent is extended or adjusted under 35 U.S.C. 154(b) by 0 days.

(21) Appl. No.: 15/700,142

(22) Filed: Sep. 10, 2017

(65) Prior Publication Data
US 2018/0148911 A1    May 31, 2018

Related U.S. Application Data

(60) Provisional application No. 62/393,415, filed on Sep. 12, 2016.

(51) Int. Cl.
| | |
|---|---|
| *F16K 31/42* | (2006.01) |
| *E03B 7/12* | (2006.01) |
| *E03B 7/07* | (2006.01) |
| *G01F 15/02* | (2006.01) |
| *G01F 15/10* | (2006.01) |
| *G01F 1/688* | (2006.01) |
| *G01M 3/04* | (2006.01) |
| *E03B 9/02* | (2006.01) |

(52) U.S. Cl.
CPC ............... *E03B 7/12* (2013.01); *E03B 7/071* (2013.01); *E03B 7/078* (2013.01); *G01F 1/6884* (2013.01); *G01F 15/022* (2013.01); *G01F 15/10* (2013.01); *G01M 3/04* (2013.01); *E03B 9/027* (2013.01); *Y02A 20/15* (2018.01)

(58) Field of Classification Search
CPC . E03B 7/12; E03B 7/071; E03B 7/078; G01F 1/6884; G01F 15/022; G01F 15/10; G01M 3/04; G05D 7/00; Y01T 137/1353
See application file for complete search history.

(56) References Cited

U.S. PATENT DOCUMENTS

| | | | |
|---|---|---|---|
| 4,800,371 A | 1/1989 | Arsi | |
| 5,038,831 A | 8/1991 | Masson | |
| 5,056,554 A * | 10/1991 | White | E03B 7/12 |
| | | | 137/312 |
| 6,057,770 A | 5/2000 | Justesen | |
| 6,675,826 B1 | 1/2004 | Newman | |

(Continued)

*Primary Examiner* — Eric Keasel
*Assistant Examiner* — Kevin R Barss
(74) *Attorney, Agent, or Firm* — Beusse, Wolter, Sanks & Maire PLLC; John L. DeAngelis

(57) ABSTRACT

A system for controlling water delivery in to and out from a structure. A plurality of sensors disposed within the structure determine one or both of a water leak from a water delivery system within the structure and a temperature. A transmitter associated with each one of the plurality of sensors transmits a signal to a controller, the signal indicates a water leak from the water delivery system or a temperature below a predetermined value. A plurality of valves within the structure control the flow of water in to the structure, out from the structure, and within the structure. The controller receives the signal and responsive thereto opens or closes one or more valves to stop water delivery into the structure, to drain water out from the structure, or to control water delivery within the structure.

19 Claims, 2 Drawing Sheets

(56) References Cited

U.S. PATENT DOCUMENTS

| | | |
|---|---|---|
| 7,966,099 B2 * | 6/2011 | Fima .................... E03B 1/00 700/276 |
| 8,196,602 B2 | 6/2012 | Korzeniowski et al. |
| 8,402,984 B1 * | 3/2013 | Ziegenbein ............ E03B 7/071 137/15.11 |
| 8,689,813 B2 | 4/2014 | Kim et al. |
| 9,683,350 B1 | 6/2017 | Mitzev et al. |
| 9,719,234 B1 | 8/2017 | Christopher et al. |
| 2013/0025709 A1 | 1/2013 | Mann et al. |

* cited by examiner

FLOOD MITIGATION AND PIPE FREEZE PREVENTION SYSTEMS FOR USE IN A STRUCTURE

CROSS REFERENCE TO RELATED APPLICATIONS

The present invention claims priority under 35 U.S.C. 119(e) to the provisional patent application filed on Sep. 12, 2016, entitled Flood Mitigation and Pipe Freeze Prevention System, and assigned application No. 62/393415. This provisional patent application is incorporated in its entirety herein.

BACKGROUND OF THE INVENTION

Currently houses and commercial buildings throughout the United States, and especially in the North, are confronted with the high cost of damage caused by failures of the structure's water delivery system. This damage occurs according to two possible scenarios: (1) leakage of a subcomponent of the water system (piping, valves, water heater, etc.) and (2) bursting of pipes due to freezing of the water carried by the system.

Damage due to leakage or freezing (referred to as an event) of any subcomponent of the water delivery system becomes especially grave if the house or building is unoccupied or unattended. Several such scenarios are identified in the list below, which is not exhaustive:

1. the event occurs when adults are at work
2. the event occurs when the family is in vacation
3. the event occurs overnight when occupants are asleep or the building is unattended or understaffed
4. the event occurs in a usually unattended room, for example in the basement These and other scenarios can result in heavy damages and cost to the owner and the insurance carrier.

Damage due to freezing of water within the system occurs in regions of the country where the temperature drops below freezing. This is due to the fact that water in solid form has a larger volume than water in a liquid state. Contrary to the usual behavior of most compounds, water expands rather than contracts, as it transforms from liquid to a solid state.

As in the case of water delivery system leakage, such an event may occur when the structure is unattended or when the occupants are unaware of the dangers associated with a frozen water delivery system.

BRIEF DESCRIPTION OF THE DRAWINGS

The forgoing and other features of the present inventions will be apparent to one skilled in the art to which the present inventions relate upon consideration of the following description of the invention with reference to the accompanying drawings, herein.

DESCRIPTION OF THE INVENTION

Before describing in detail the particular methods and apparatuses related to flood mitigation and pipe freeze mitigation systems of the present invention, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments.

The presented embodiments are not intended to define limits as to the structures, elements or methods of the inventions, but only to provide exemplary constructions. The embodiments are permissive rather than mandatory and illustrative rather than exhaustive.

One embodiment of the present invention solves the problems identified above by including components to clear the water delivery system of all water in the case of freezing and to stop the inflow of water in the case of either a freezing or a leakage situation. The invention also provides for manual and electronic overrides available to the owner/occupant/user in a scenario where water flow is required and leakage or freezing is the lesser evil (as in the case of fire). One embodiment includes an automatic override feature, activated from within the structure, in a situation when it is inconvenient (e.g., during rain, snow) to operate a manual override outside the structure at the water intake or in conditions when it is dangerous to go outside (e.g., during a blizzard or hurricane). In another embodiment, the system comprises a manual override, at the intake, for a scenario in which the electronic system malfunctions or when there has been a power loss. Another embodiment includes failsafe operation so that the occurrence of certain events, such as a power loss, places the system in a safe state, unless manually overridden.

Figure 1:
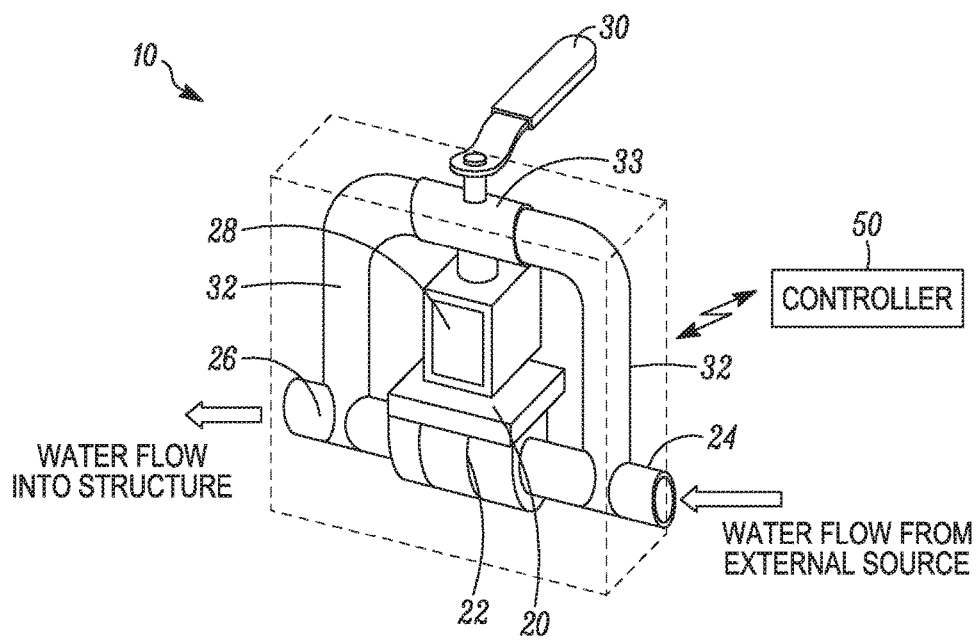
FIG. 1 is a front view of a flood mitigation system of the present invention.
Figure 2:
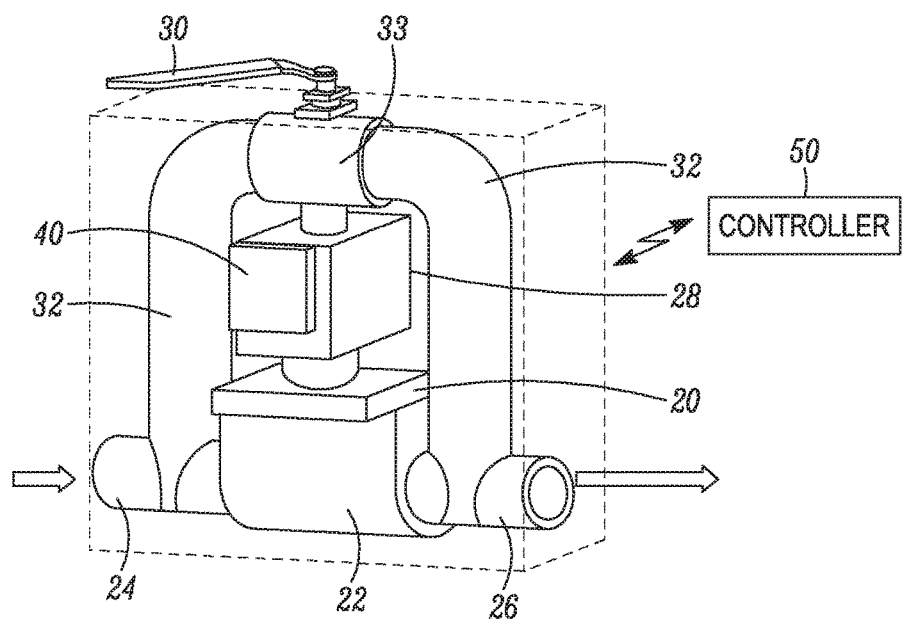
FIG. 2 is a rear view of the flood mitigation system of the present invention.

The figures and the description of roles and modes of operation set forth below explain operation of a flood mitigation system 10 of the present invention. Refer to FIGS. 1 and 2.

Flood Mitigation System 10

Power Sensing Relay Switch 20

Automatically opens or closes a shutdown valve 22. For example, when power is lost the valve 22 closes to stop water flow into the structure.

Water flow in FIG. 1 is in a direction from an intake port 24 from an eternal source of water supply, to an outflow port 26 into a structure.

Maintains the shutdown valve 22 in an open condition when powered.

Closes the shutdown valve 22 responsive to a close signal from a wireless receiver 28, as described further below. This action stops the flow of water into the structure from the external source.

The shutdown valve 22 can be bypassed by manual operation of a handle 30, in effect, opening a bypass path 32 and associated bypass valve 33 around the shutdown valve 22.

The relay switch 20 senses when power has been lost (or receives a signal from a controller 50 indicating power loss) and responsive thereof closes the shutdown valve 22. One embodiment includes a delay function before operating the relay switch 20, i.e., the switch 20 does not close the valve 22 until a predetermined number of seconds has elapsed from loss of power.

Sensors disposed at various locations within the structure in which the flood mitigation system 10 is installed, provide information to a controller 50 (described below) for controlling the system, e.g., opening or closing the shutdown valve 22, by sending an appropriate signal to the power sensing relay switch.

With reference to the rear view of FIG. 2, electrical contacts 40 are illustrated for supplying power to the wireless receiver 28 and the power sensing relay switch 20.

Wireless Receiver 28

Receives signal from the controller 50 (further comprising a receiver and transmitter) to open or close the relay switch 20, which in turn opens or closes the shutdown valve 22.

The controller 50 can be programmed with parameters that when satisfied signal the relay switch 20 to close (or open) the shutdown valve 22.

Sensor signals (described further below) are provided to the controller 50 (over a wired or wireless communications link) for controlling operation of the flood mitigation system 10.

The wireless receiver 28, as well as other elements of the system (including the receiving and transmitting components of the controller 50), can be based on protocols according Wi-Fi, Bluetooth, Zigbee or other communications standards known in the art.

Shutdown Valve 22

Controlled by the relay switch 20 to open or close the flow path between the intake port 24 and the outflow port 26.

In one embodiment, the shutdown valve 22 is typically a ball valve with a handle for manually overriding a closed condition of the valve 22.

Operating the handle opens the valve.

According to another embodiment, illustrated in FIG. 1, a manual override bypass valve 33, as described further below, allows the user to override the condition of the shutdown valve 22.

A sensor (not shown) determines a state of shutdown valve 22 and notifies the controller 50 as to that state (opened or closed) and also when the valve 22 is in the override state.

Manual Override Bypass Valve 33

Is normally closed to water flow so that water flow is controlled by the condition of the shutdown valve 22.

When opened, the manual override bypass switch 33 overrides a closed condition of the shutdown valve 22, allowing water to flow through the bypass path 32 from the intake port 24 to the outflow port 26.

Intake Port 24

Water flows into the intake port 24.

Outflow Port 26

Water flows out of the system at the outflow port 26.

Bypass Piping 32

Water flows (or stops flowing) through the system, including the shutdown valve 22 based on an operator-controlled position of the manual override bypass valve 33.

Controller 50 (Including a Programmable Controller and Wireless Receiver and Transmitter)

Receives signals from all the sensors (see FIG. 6 for locations and function of various exemplary sensors).

The controller 50 makes decisions to open or close valve(s), distinguishing between the flood mitigation system 10 and a pipe freeze system 58 as described further below.

Controls all valves in the flood mitigation system 10.

Registers all system sensors.

Registers and identifies all sensors by their electronic ID's.

Registers all system valves

Registers the valve type (i.e., associated with the pipe freeze mitigation system 58 or the flood mitigation system 10)

Registers and identifies all valves according to their electronic ID's

Includes a human interface screen and keyboard for use by a user (or technician, installer, etc.) to program the system.

In addition to programming the system, the interface screen and keyboard are used to monitor a current system state. Exemplary displays include:

Displays: "Normal" state

Displays: "Triggered," including opened/closed valve(s) and the sensor(s) responsible for opening or closing the respective valve.

Displays the valve(s) that have been manually overridden.

Sensors (for Determining Water Presence and Water and/or Air Temperature)

Water presence sensor(s) detect water accumulation at its installed location. Generally, such sensors are installed in, for example, bathrooms, basements, under kitchen counters and in a commercial structure at any location where a water leak can be detrimental.

Temperature sensor(s) detects the water (or air) temperature at its installed location, in particular at locations where the pipe may begin to freeze.

Pipe Freeze Mitigation System 58

The pipe freeze mitigation system 58 is similar in certain aspects to the flood mitigation system 10, with the following exceptions or variations:

The pipe freeze mitigation system 58 does not include a bypass flow path, such as the bypass flow path 32 of FIGS. 1 and 2.

The pipe freeze mitigation system includes a manual override bypass switch connected to an outflow port.

When the power is off, a power sensing relay switch opens, i.e. permits the flow of water out from the structure in which the pipe freeze mitigation system 58 is installed. With the power off, the structure is more likely to experience a freeze condition; by permitting the water to exit the structure frozen pipes are avoided.

Figure 3:
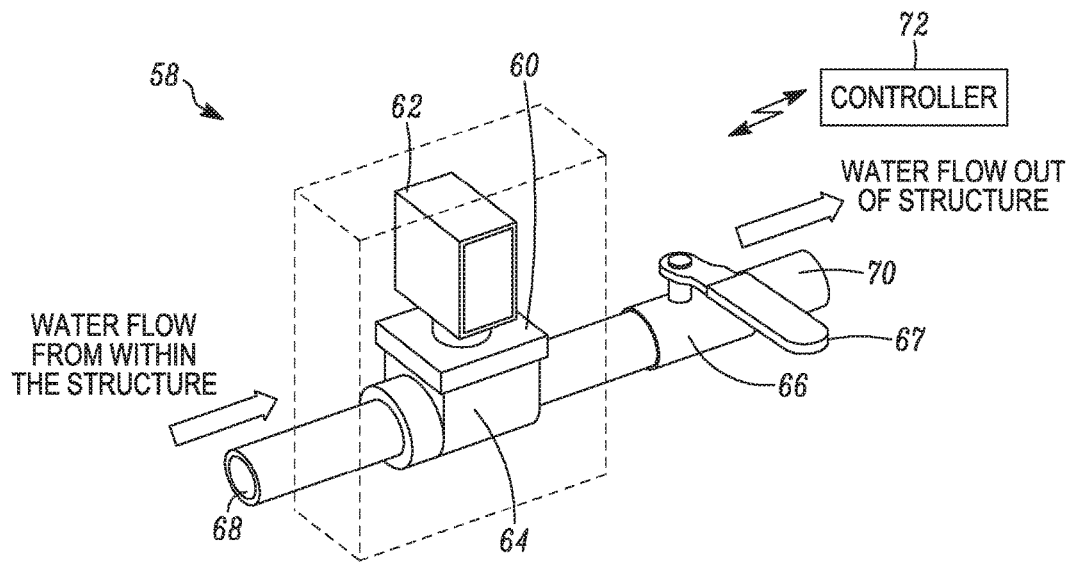
FIG. 3 is a front view of a pipe freeze mitigation system of the present invention.

FIG. 3 and the description of roles and modes of operation set forth below explain operation of the pipe freeze mitigation system 58 of the present invention.

Power Sensing Relay Switch 60

Automatically opens or closes pipe freeze prevention valve 64 as controlled by signals from a controller 72.

The power sensing relay switch 60 maintains the valve 64 in a closed condition when powered unless opened responsive to a signal from a wireless receiver 62.

The power sensing relay switch 60 opens the valve 64 when there is no power, permitting water to drain from the structure. This "no-power" condition can be determined by the power sensing relays switch 68 or a signal from the controller 72 can indicate a power condition (e.g., power or no power to the structure).

The power sensing relay switch 60 also opens the valve 64 in the event a freeze condition within the structure or within the structure's water delivery system is detected, as signaled from the controller 72.

Wireless Receiver 62

Receives signal from the programmable controller 72 (further comprising a receiver and transmitter) to open or close the power sensing relay switch 60, which in turn opens or closes the pipe freeze prevention valve 64.

These signals originate from the controller 72, that can be automatically or manually programmed with parameters, that when satisfied signal the power sensing relay switch 60 to close (or open) the valve 64. Sensor signals (described further below) are provided to the controller 72 for controlling operation of the system.

The wireless receiver 62, as well as other elements of the system (including the receiving and transmitting components of the controller 72) can be based on protocols according Wi-Fi, Bluetooth, Zigbee or other communications standards known in the art.

Electrical prongs (not shown) are located on a rear surface of the wireless receiver 62 for supplying power to the various components of the pipe freeze mitigation system 58.

Pipe Freeze Prevention Valve 64

Controlled by the power sensing relay switch 60.

When opened, water flows from an intake port 68 that carries water from within the structure to an outflow port 70 that carries the water out from the structure.

Manual Override Bypass Valve 66

Normally open to permit water flow from the intake port 68 to the outflow port 70 as controlled by the condition of the pipe freeze prevention valve 64.

The manual override bypass switch 66 closes water flow from the intake port 68 to the outflow port 70.

Typically, the override bypass switch 66 comprises a ball valve with a handle 67 to allow an override in the event of a system malfunction.

A sensor (not shown) associated with the manual override bypass valve 66 notifies the controller 72 that the valve 66 is in the override state.

Intake Port 68

Water flows into the intake port 68 from pipes within the structure.

Outflow Port 70

Water flows from the outflow port 70 out of the structure, to a sewer system, for example.

Controller 72

Receives signals from all the sensors (see FIG. 6 for location and function of various exemplary sensors).

Makes decisions to open or close valve(s) in the system, distinguishing between the flood mitigation and pipe freeze systems, based on system and valve conditions.

Controls all valves in the system.

Registers all system sensors.

Registers and identifies all sensors by their electronic ID's.

Registers the number of system valves

Registers the valve type (i.e., pipe freeze mitigation system 58 or the flood mitigation system 10)

Registers and identifies all valves according to their electronic ID's

Includes a human interface screen and a keyboard for use by a user (or technician, installer) to program the system:

In addition to programming the system, the interface screen and keyboard are used to monitor a current system state.

Displays: "Normal" state

Displays: "Triggered," including opened/closed valve(s) and the sensor(s) responsible for opening or closing the respective valve.

Displays the valve(s) that have been manually overridden.

Sensors (for Water Presence and Temperature)

Water sensor(s) detects water accumulation at its installed location.

Generally, such sensors are installed in, for example, bathrooms, basements, under kitchen counters and in a commercial structure at any location where a water leak can be detrimental.

Temperature sensor(s) detects the water temperature at its installed location, in particular at locations where the pipe may begin to freeze.

Co-located components of the flood mitigation system 10 and the pipe freeze mitigation system 58 may be housed within an enclosure or casing for protection of the various components.

Flood Mitigation System Operation

Figure 4:
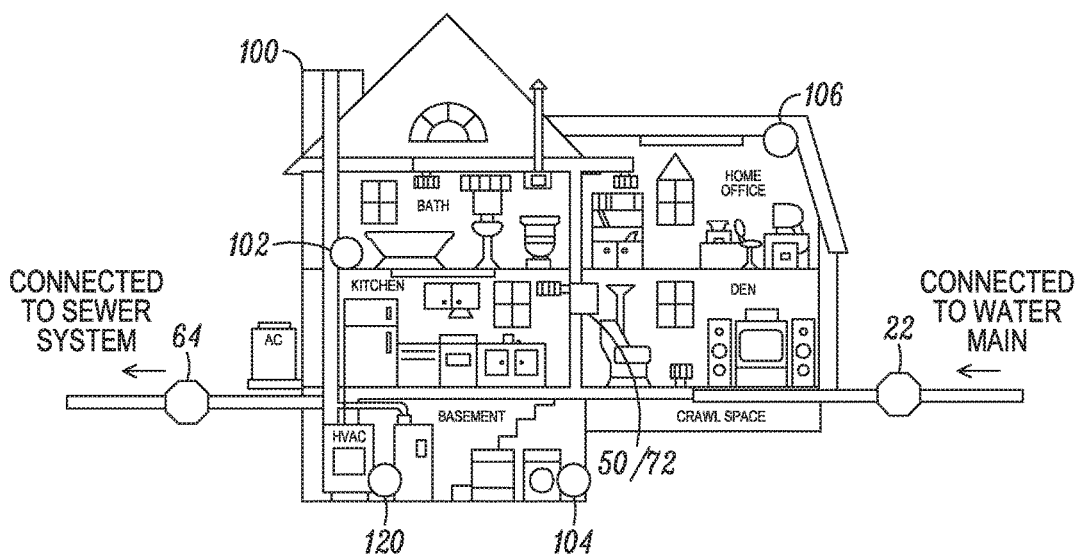
FIG. 4 illustrates a flood mitigation system and pipe freeze mitigation system installed in a house.

FIG. 4 illustrates an exemplary system configuration for a house 100. Although operation is described with reference to the house 100, the systems of the invention can be installed in any commercial or industrial building (e.g., school, hospital, restaurant, office, factory)

Wireless water presence sensors 102 and 104 detect accumulation of water on a bathroom floor (the sensor 102) and on a basement floor (the sensor 104) and wirelessly relay the condition to the controller 50.

Signal from either sensor 102 or 104 may be amplified by a wireless repeater 106.

The controller 50 sends a wireless signal to the wireless receiver 28 for closing the shutdown valve 22 (see FIG. 1) to cut the flow of water into the structure.

If the flood condition is localized to a specific area of the structure, the controller can send a message to the appropriate valves to stop water flow to the flooded area.

If previously programmed accordingly, the controller 50 sends a text message, email, or makes a robot-call to one or more programmed phone numbers, indicating that water accumulation was detected and the system has been triggered to shut water flow into the house 100.

Pipe Freeze Mitigation System Operation

A temperature sensor 120 emits a signal upon detecting a temperature value within a predetermined range of the freezing point of water.

The signal may be amplified by the wireless repeater/amplifier 106.

Upon receiving the signal from the temperature threshold sensor 120, the controller 72 sends a wireless signal to the wireless receiver 28 for closing the shutdown valve 22 to cut the flow of water into the house 100.

The controller 72 also sends wireless signal to the wireless receiver 62 to open the pipe freeze prevention valve 64 to drain water from pipes within the house 100.

If previously programmed accordingly, the controller 72 sends a text or a robot-call to a programmed phone number, indicating that pipe freezing threshold was detected and the system has been triggered.

Fail Safe Operation

If the flood mitigation system has been triggered, but the occupant desires to keep the flow of water into the house/building, the occupant can override the system utilizing the manual override valve 33 (see FIG. 1).

If the freeze prevention system has been triggered, but the occupant desires to keep water in the pipes, occupant can override the system utilizing manual override switch 66 of FIG. 3.

If either the flood mitigation or the pipe freeze prevention manual override valves (reference numerals 33 and 66) have been activated, the controller 50/72 warns of this condition, such as by illuminating a warning LED or displaying a warning on the display screen.

In the case of a power outage the flood mitigation valve 22 automatically closes (shutting the flow of water into structure) and the pipe freeze prevention valve 64 automatically opens (evacuating water from the structure's pipes). A user-controlled override can prevent either of these warnings and the attendant valve conditions.

Although the present invention has been described in the context of a house, the teachings of the invention can be applied to any commercial or industrial buildings, for example, factories, offices, hospitals, schools, storage, etc.

Certain system parameters (e.g., the temperature at which the freeze prevention system is activated) will vary depending on the specific installation and conditions associated with that installation. For example, the use of a wireless signal amplifier or repeater may not be required in all installations.

Certain embodiments and installations may further comprise pressure sensors. One or both of the flood mitigation system 10 and/or the pipe freeze mitigation system 58 may be activated based on a predetermined pressure value.

In another embodiment, temperature sensors can be placed at multiple locations in the structure. If any one of the temperature sensors senses a temperature in excess of a predetermined value, the pipe freeze mitigation system 58 is activated.

The system of the invention is scalable, i.e., more sensors, repeaters, etc. can be added to the system as necessary for the installation.

Although described in the context of stopping water delivery to the entire structure, in another embodiment if one or more sensors localizes a water leak (or a low temperature that may cause a pipe freeze situation) to an area of the structure, valves within the water delivery system of the structure can be opened/closed to stop water delivery to that area.

Although the system has been described as including a controller 50 for the flood mitigation system and a controller 72 for the pipe freeze mitigation system, those skilled in the art recognize that a single controller (processor based or micro-controller based) can perform the control functions for both the flood mitigation system and the pipe freeze mitigation system.

What is claimed:

1. A system for controlling water delivery in to and out from a structure, the system comprising:
   a plurality of sensors disposed within the structure for determining one or both of a water leak from a water delivery system within the structure and a temperature;
   a transmitter associated with each one of the plurality of sensors for transmitting a signal to a controller, the signal indicating a water leak from the water delivery system or a temperature below a predetermined value;
   a shutdown valve for controlling the flow of water into the structure;
   a pipe freeze mitigation valve for controlling the flow of water out from the structure;
   a plurality of valves at different locations within the structure for directing the flow of water within the structure;
   the controller for receiving the signal and responsive thereto for closing the shutdown valve to prevent water from entering the structure, or for opening the pipe freeze mitigation valve to drain water from the structure, or for closing one or more of the plurality of valves to control water delivery to different locations within the structure;
   a shutdown override valve oriented in parallel fluid flow with the shutdown valve and controllable to an open state for overriding a closed state of the shutdown valve;
   a pipe freeze mitigation override valve oriented in serial fluid flow with the pipe freeze mitigation valve and controllable to a closed state for overriding an o en state of the pipe freeze mitigation valve; and
   responsive to a loss of power to the structure, the shutdown valve is closed to stop the flow of water into the structure and the pipe freeze mitigation valve is opened to drain water from the structure.

2. The system of claim 1 the shutdown override valve controllable to the open state manually or by action of the controller.

3. The system of claim 1 the pipe freeze mitigation override valve controllable to the closed state manually or by action of the controller.

4. The system of claim 1 wherein the temperature comprises ambient air temperature within the structure or water temperature within the water delivery system.

5. The system of claim 1 wherein in response to a signal indicating a temperature below a predetermined value, the controller opens the pipe freeze mitigation valve to permit water to drain from the structure.

6. The system of claim 1 wherein one or more of the plurality of sensors detects a water leak condition within the structure, and responsive thereto the controller controls the shutdown valve to stop water flow into the structure.

7. The system of claim 1 wherein one or more of the plurality of sensors determines a water leak condition or a pipe freeze condition within an area of the structure, and responsive thereto the controller controls one or more of the plurality of valves to stop water flow into the area of the structure.

8. The system of claim 1 wherein the transmitter associated with each one of the plurality of sensors transmits to the controller over a wired or a wireless communications link.

9. The system of claim 1 further comprising a power sensor, wherein when the power sensor detects a loss of power to the structure the controller causes the shutdown valve to close or causes the pipe freeze mitigation valve to open.

10. The system of claim 1 responsive to a loss of power to the structure, the controller signals closing of the shutdown valve to stop the flow of water into the structure or signals opening of the pipe freeze mitigation valve to drain water from the structure.

11. The system of claim 1 the controller for sending a text message, for sending an email, or for initiating a robot-call to one or more programmed telephone numbers, indicating detection of water accumulation and closure of the shutdown valve, or for sending a text message, for sending an email, or for initiating a robot-call to one or more programmed phone numbers, indicating detection of predetermined temperature and opening of the pipe freeze mitigation valve.

12. The system of claim 1 the shutdown valve comprising a first receiver, the pipe freeze mitigation valve comprising a second receiver, and each one of the plurality of valves comprising a third receiver, the first receiver, the second receiver, and each one of the third receivers for receiving a signal from the controller to control a state of the respective valve.

13. The system of claim 1 the controller storing a plurality of sensor threshold values for use in controlling the shutdown valve or for controlling the pipe freeze mitigation valve.

14. The system of claim 1 further comprising a human interface screen for displaying a system status and for use in programming the system.

15. The system of claim 1 further comprising a wireless repeater for amplifying signals between and among each one of the plurality of sensors, the shutdown valve, the pipe freeze mitigation valve, and the controller.

16. The system of claim 1 at least one of the plurality of sensors located in an area of the structure where a leak in the water delivery system may occur and at least another one of the plurality of sensors located in an area of the structure where water may freeze within a pipe of the water delivery system.

17. The system of claim 1 the controller for causing issuance of a warning when the shutdown override valve is in an open state or the pipe freeze mitigation override valve is in a closed state.

18. The system of claim 1 further comprising a plurality of pressure sensors disposed on the water delivery system for providing a water pressure value to the controller.

19. The system of claim 1 wherein the controller is aware of the state of the shutdown valve, the pipe freeze mitigation valve, the shutdown override valve and the pipe freeze mitigation override valve.

\* \* \* \* \*